Dec. 17, 1963  G. C. WRIGHT  3,114,491
CONTROL APPARATUS FOR FORM FEEDING DEVICES
Filed June 26, 1962   6 Sheets-Sheet 1

INVENTOR.
GERARD C. WRIGHT
BY
Gordon R. Sanborn
ATTORNEY

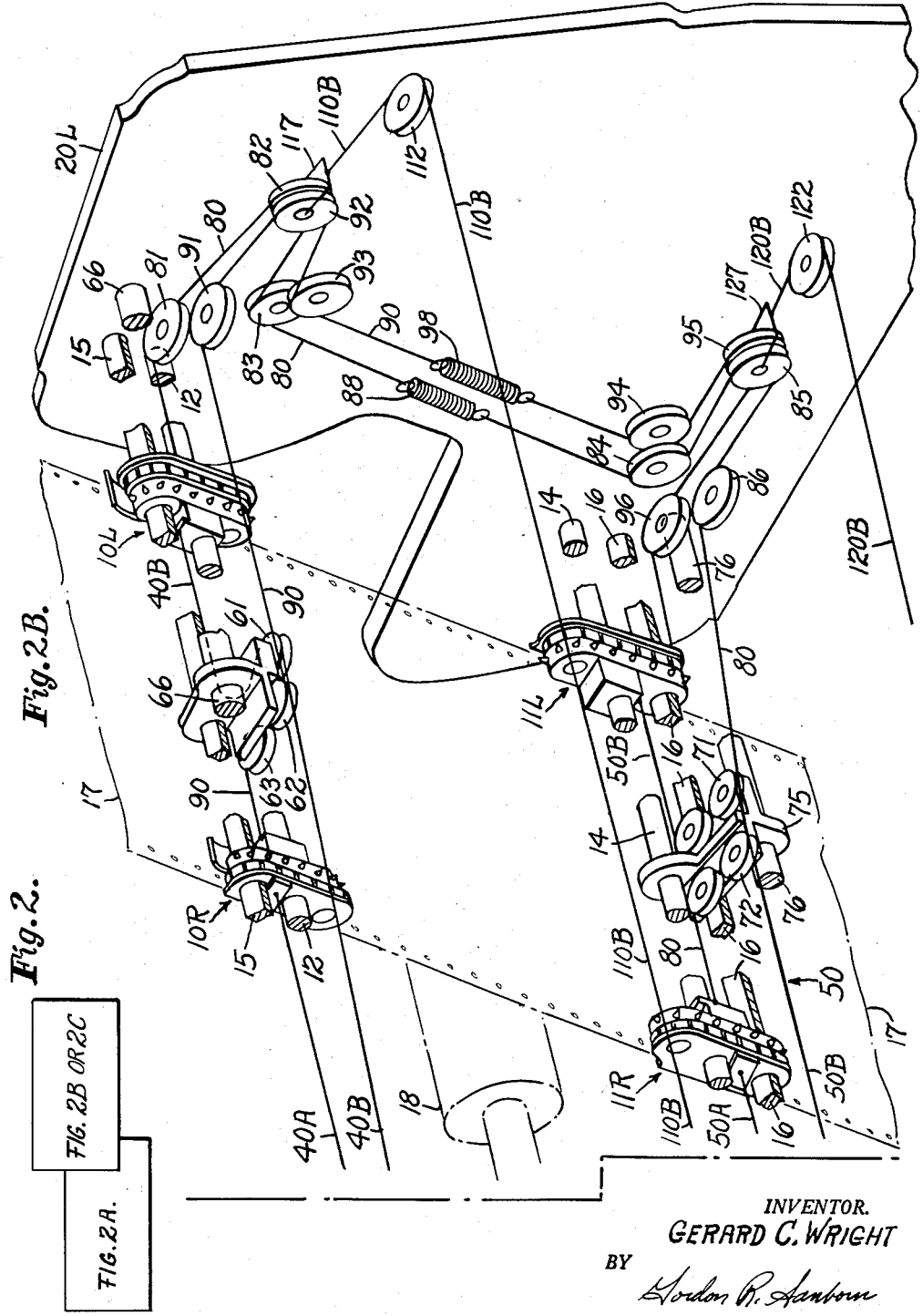

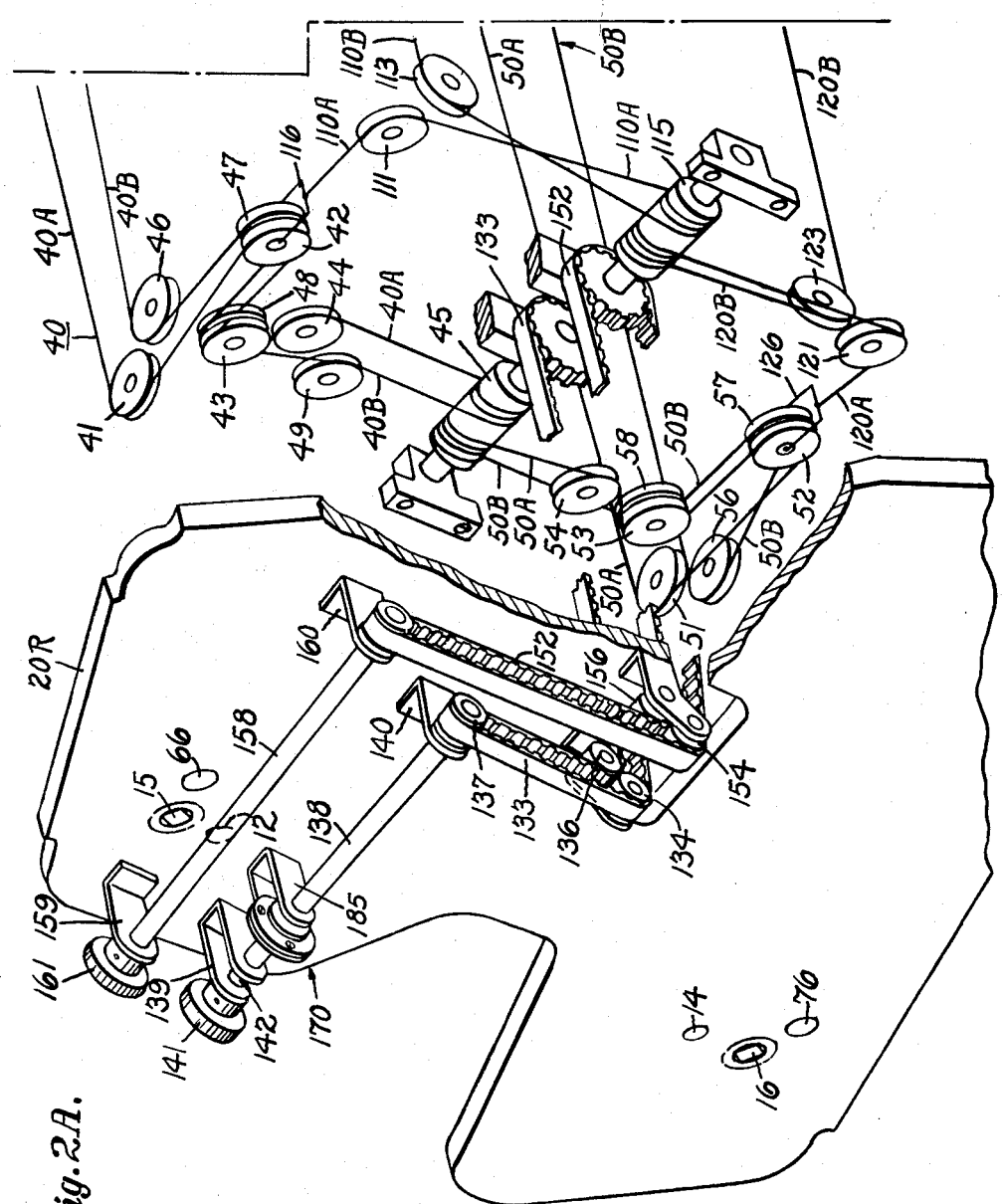

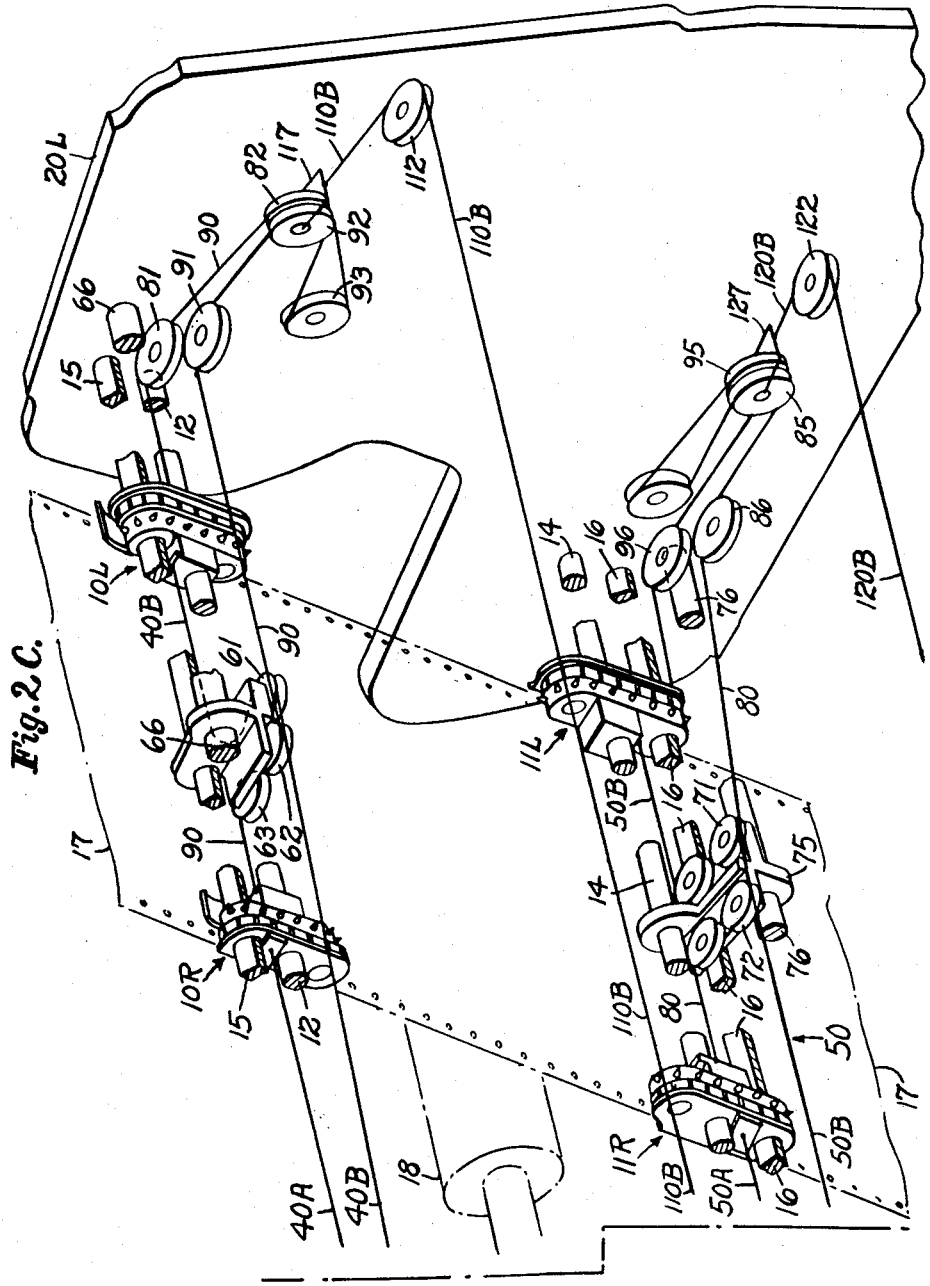

Dec. 17, 1963  G. C. WRIGHT  3,114,491
CONTROL APPARATUS FOR FORM FEEDING DEVICES
Filed June 26, 1962  6 Sheets-Sheet 5

INVENTOR.
GERARD C. WRIGHT
BY
ATTORNEY

Dec. 17, 1963  G. C. WRIGHT  3,114,491
CONTROL APPARATUS FOR FORM FEEDING DEVICES
Filed June 26, 1962  6 Sheets-Sheet 6
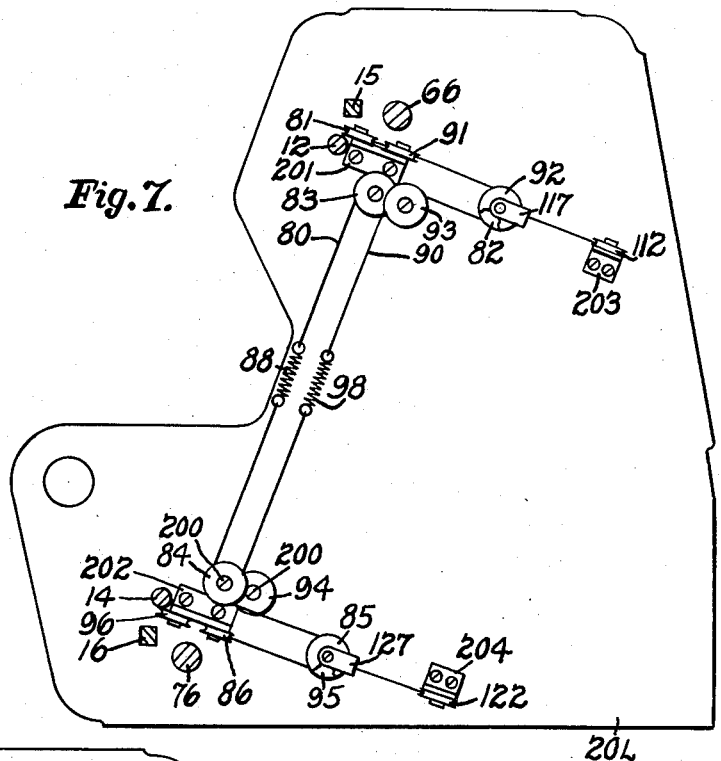
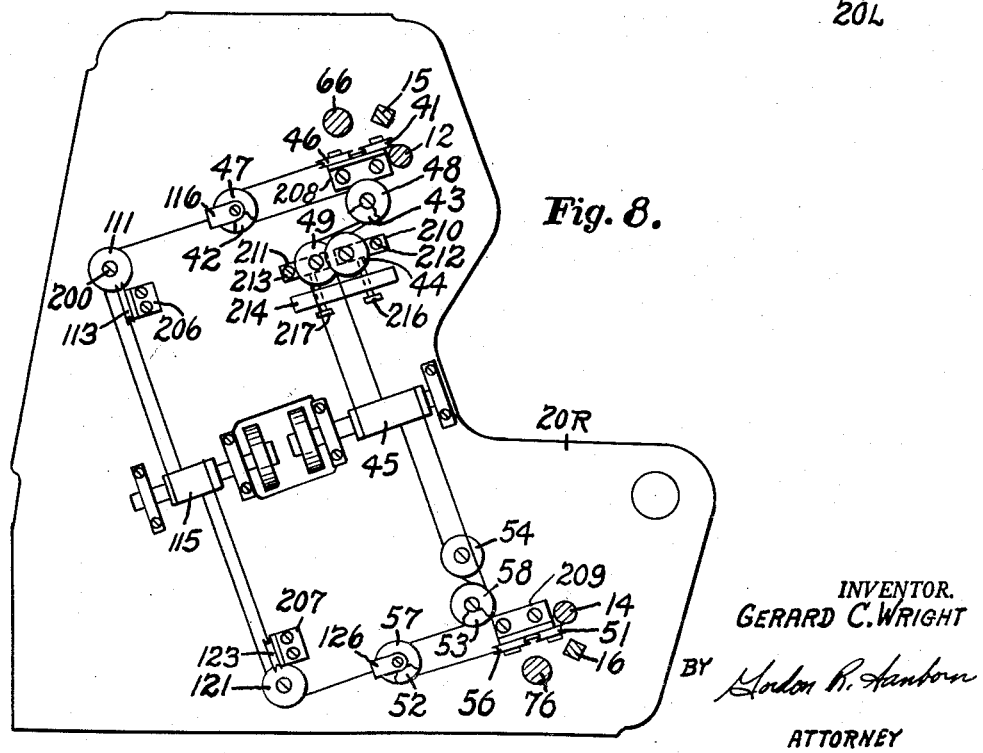
INVENTOR.
GERARD C. WRIGHT
BY
ATTORNEY

United States Patent Office 3,114,491
Patented Dec. 17, 1963

3,114,491
CONTROL APPARATUS FOR FORM FEEDING DEVICES
Gerard C. Wright, Grosse Pointe, Mich., assignor to Burroughs Corporation, Detroit, Mich., a corporation of Michigan
Filed June 26, 1962, Ser. No. 205,286
12 Claims. (Cl. 226—75)

The present invention relates to the feeding of forms in high speed printers and more particularly to an improved apparatus for controlling the adjustment of such form feeding devices.

In printers of the type commonly referred to as drum printers the printing apparatus often includes a wide drum having rows of type fonts disposed thereabout with solenoid actuated hammers being selectively energized during rotation of the drum to cause printing to occur on a paper form disposed between the drum and the hammers. Endless or continuous forms having perforated feed holes along the edges thereof are commonly used in such printers. Two sets of feed devices referred to in the art as tractors are used to control the advance of the forms, one set being disposed below the type drum to serve as the "infeed" tractor and the other pair being disposed above the type drum to serve as the "out-feed" pair of tractors. United States Patent No. 3,006,520 to House illustrates one type of tractor as well as the apparatus used for driving them in a drum printer. In drum printers such as that illustrated in the House patent the spread of the tractors to accommodate form of various widths is controlled by means of a threaded shaft assembly. In a similar manner the lateral position of the four tractors is controlled by the selective rotation of threaded shafts appropriately coupled with the tractors. While such apparatus can be used to control the position of the tractors, it is found that the cost thereof is relatively high and the apparatus has certain drawbacks in regards the manner in which the spread and lateral position of the tractors is controlled.

Accordingly it is an object of the present invention to provide an improved control apparatus for form feed devices. It is a further object of the present invention to provide an improved form feed adjustment apparatus for a high speed printer. Another object of the present invention is to provide an improved paper feed apparatus adapted for use in a high speed printer and in particular to provide an adjustment means for the paper feed apparatus which simplifies the lateral positioning of the paper feed mechanism. An additional object of the present invention is to provide an improved control apparatus for paper feed devices which permits rapid adjustment of the spread of the devices for forms of various widths as well as rapid adjustment of the lateral position of the form. Another object is to provide a simplified and low cost tractor positioning apparatus for a high speed printer together with means for holding the tractors in a preset condition for a given form even though the tractors and form are translated in the printer.

These objects are achieved in accordance with the present invention by the use of a system of flexible coupling devices such as cables which are connected to the paper feed tractors in a manner such that the manipulation of a pair of manual adjustment knobs will serve to control the spread of the tractors as well as the lateral positions thereof. First and second cables are so connected respectively to upper and lower sets of tractors and wound about a first rotatable element (in the form of a threaded cylinder) in a manner such that when the cylinder is rotated a portion of each of the two cables will be wound thereon while simultaneously therewith another portion of each of the two cables will be removed therefrom. Third and fourth cables interconnect the upper and lower tractors in a manner such that the rotation of the cylinder in one direction or the other will serve to increase or decrease the spread (or separation) of the left and right tractors.

Fifth and sixth cables are wound about a second threaded cylinder and are connected to sets of movable pulleys around which the previously mentioned cables pass in a manner such that when the second cylinder is rotated the four tractors will be simultaneously translated to the left or to the right by the same distance. Hence the lateral position of the form which the tractors serve to drive is readily controlled by the rotation of the second cylinder. The fifth and sixth cables and the movable pulleys associated therewith are so coupled with the first four cables that if during the changing of the spread of the tractors one of the sets thereof reaches its maximum extent of leftward or rightward movement the spread thereof can be further increased (or decreased as the case may be) without any need for the operator to move the tractors of the set away from their limit positions. This greatly facilitates the control of the spread of the tractors.

These and other objects of the present invention as well as additional advantages thereof will be more clearly understood from the following description when read with reference to the accompanying drawings which illustrate a preferred embodiment of the invention and in which, FIG. 1 is a perspective view from the left front corner of a drum printer having upper and lower sets of paper feed devices;

FIG. 2 is a block diagram showing the relationship of FIGS. 2A and 2B to form one embodiment of the invention and the relationship of FIGS. 2A and 2C to form another embodiment;

FIG. 2A is a perspective view from the right rear corner of the machine showing the right-hand portion of the tractor adjustment apparatus;

FIG. 2B is a perspective view from the right rear corner of the machine showing the left-hand portion of one embodiment of the tractor positioning apparatus;

FIG. 2C is a perspective view from the right rear corner of the machine showing a left-hand portion of another embodiment of the tractor positioning apparatus;

FIG. 7 is a right side view of the left main frame tobether with the pulleys supported thereby.

FIG. 8 is a left side view of the right main frame and pulley assemblies supported thereby.

Figure 1:
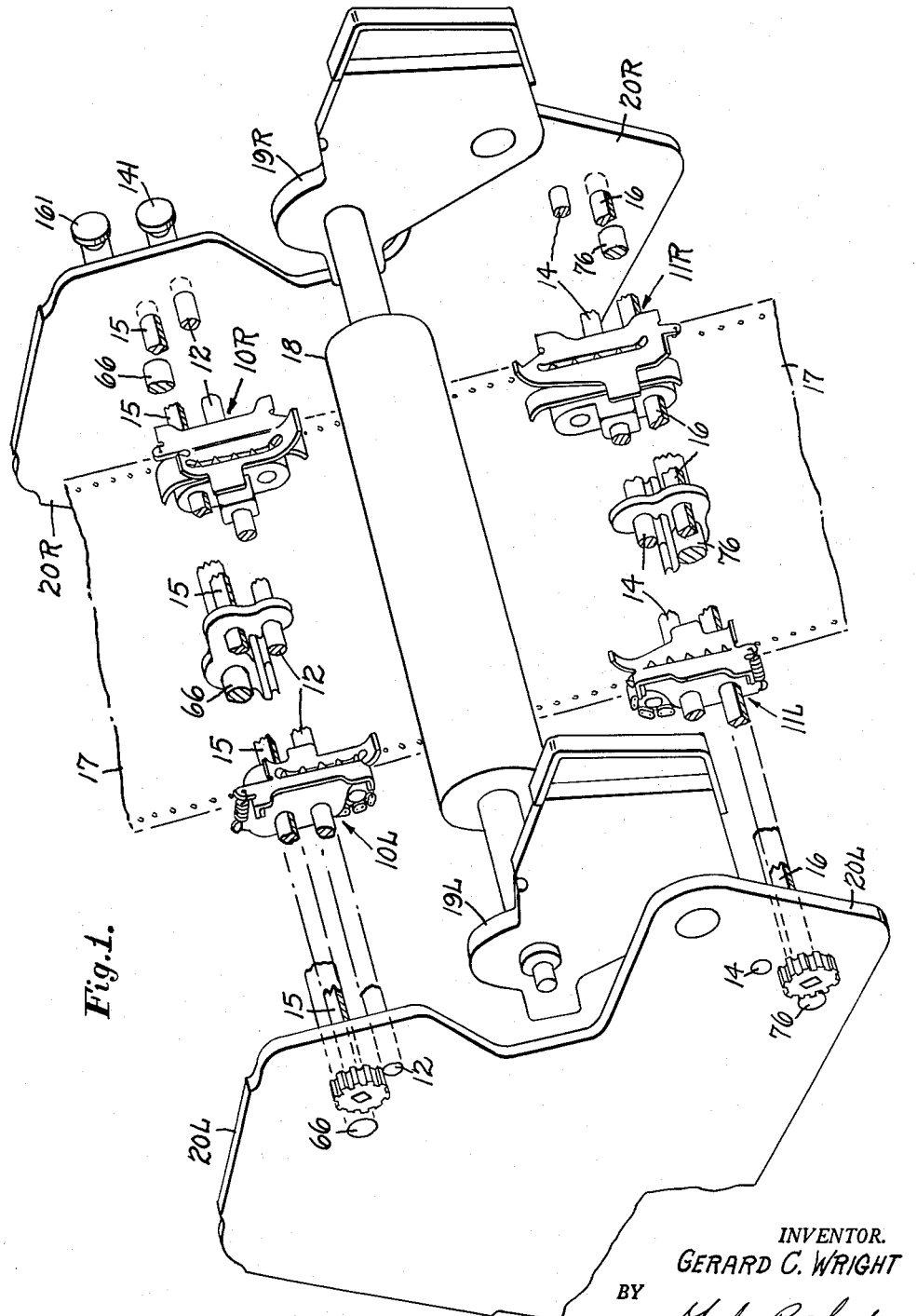

In the following description of the preferred embodiment of the invention illustrated in the drawings, the term left and right, up and down, top and bottom, and front and rear will be used with reference to the parts in the machine as seen by a person viewing the machine in front of, above, or from the right-hand side thereof.

Referring now to the drawings and in particular to FIG. 1 there is illustrated a portion of a high speed drum printer similar to the one illustrated in U.S. Patent No. 3,006,520. It will be seen in FIG. 1 that the printer includes an upper set of paper feed devices referred to as tractors 10R and 10L as well as a lower set of tractors 11R and 11L. The tractors 10R and 11R and the tractors 10L and 11L together form sets which can be referred to as right and left sets respectively. The tractors 10R and 10L are supported for independent lateral movement on a round shaft 12 supported by and extending between the main machine frames 20R and 20L. In a similar manner the lower tractors are supported for sliding movement on a round shaft 14 extending between frames 20R and 20L. A rectangular driveshaft 15 passes through the upper tractor assemblies and is drivingly coupled therewith in a manner similar to that illustrated in the above-identified House patent so that when the shaft 15 is rotated the tractor assemblies 10R and 10L will serve to advance the paper form with which the tractors are engaged. In a similar manner a second rectangular driveshaft 16 is drivingly coupled with the lower tractor assemblies and serves to drive said lower tractors. As described in U.S. Patent No. 3,006,520, and as is well known in the art, the driveshafts 15 and 16 are supported for rotation by the frames 20R and 20L and are adapted to be simultaneously rotated to advance the form 17. It will be seen in FIG. 1 that a type drum 18 is supported for rotation by means of a pair of frames 19L and 19R carried by the main support frames 20L and 20R in a manner such that the drum 18 can be rocked away from the form 17 to facilitate the loading of a form in the machine. Further details of the drum 18 and drive apparatus therefor as well as details of the actual printing apparatus and drive for the shafts 15 and 16 are not illustrated herein since such apparatus is well known in the art and forms no part of the present invention.

Figures 4, 5:
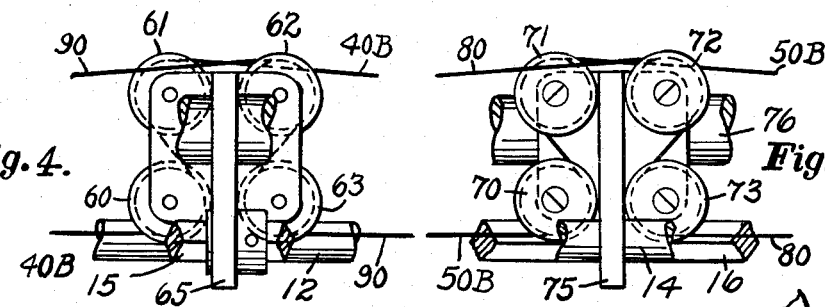
FIG. 4 is a top view of the central stationary support for four of the pulleys used in connection with the upper tractor adjustment apparatus.
FIG. 5 is a top view of four of the stationary pulleys associated with the lower tractor adjustment apparatus.

Referring now to FIGS. 2A and 2B it will be seen that a first flexible force transmitting member preferably in the form of a steel cable 40 has two portions identified as 40A and 40B connected to the upper tractors. The left end of the section 40A is connected to the right side of tractor 10R and from thence it passes around a stationary pulley 41, around a movable pulley 42, a stationary pulley 43, a stationary pulley 44, and then around a rotatable member shown for purposes of illustration as a threaded cylinder 45. The left end of the half of the cable 40 identified as 40B is secured to the right side of the tractor assembly 10L. As seen in FIGS. 2A, 2B and 4 the section 40B extends to the right from the tractor assembly 10L, around stationary pulleys 60 and 61 supported for rotation by a stationary upper central pulley support 65, around a stationary pulley 46 (FIG. 2A), around a movable pulley 47, around stationary pulleys 48 and 49 and then around the threaded cylinder 45.

In a substantially identical manner a second cable 50 having first and second sections 50A and 50B is connected to the lower tractors 11R and 11L. It will be seen in FIG. 2A that the section 50A which is connected to the tractor 11R passes around stationary pulley 51, movable pulley 52, stationary pulley 53, stationary pulley 54, and then around the front end of the threaded drum 45. From FIG. 5 it will be seen that the section 50B connected to the tractor 11L extends to the right therefrom, around the stationary pulleys 70 and 71 carried by the lower stationary central pulley support 75. Cable 50B then extends to the right around pulley 56, pulley 57 to stationary pulley 58 (FIG. 2A) and then around the threaded cylinder 45.

A third cable 80 (FIGS. 2A and 2B) is connected to the left side of the top left tractor 10L and passes around a fixed pulley 81, a movable pulley 82, a stationary pulley 83, a stationary pulley 84, a movable pulley 85, a stationary pulley 86, around the stationary pulleys 72 and 73 carried by the lower support 75 (FIG. 5), and then is secured to the left side of the bottom right tractor 11R. In a similar manner a fourth cable 90 is connected to the left side of the top right tractor 10R and then passes around the stationary pulleys 63 and 62 (FIG. 4), a stationary pulley 91, a movable pulley 92, a stationary pulley 93, a stationary pulley 94, a movable pulley 95, a stationary pulley 96, and is then connected to the left side of the lower left tractor 11L. It will be seen that the cable 80 interconnects tractors 10L and 11R and that cable 90 interconnects tractors 10R and 11L.

As seen in FIGS. 1 and 2B the stationary upper central pulley support 65 is supported by a heavy shaft 66 extending between the main frames 20R and 20L. The pulley support 65 is secured to the shaft 66 in a manner such that there can be no relative movement therebetween, and is provided with bearings to receive and serve as a central support for the shafts 12 and 15. In a similar manner the lower central pulley support 75 is supported by a heavy shaft 76 extending between the main frames 20R and 20L and also provides central support for the shafts 14 and 16. Each of the pulleys referred to as being "fixed" pulleys (except for the pulleys 60, 61, 62 and 63 carried by support 65 and pulleys 70, 71, 72 and 73 carried by support 75) is supported by a suitable screw or bracket on the main frames 20R or 20L. The position and manner of support is most clearly shown in FIGS. 7 and 8.

From the above it will be seen that when the threaded cylinder 45 is rotated counterclockwise (as seen from the front) section 40A of the first cable will be wound onto the cylinder while section 40B of the first cable will be unwound. As a result thereof the right tractor 10R will be pulled to the right while sufficient length will be added to the section 40B to allow movement of the upper tractor 10L to the left in the manner to be described. It will be seen that the counterclockwise rotation of cylinder 45 will also cause section 50A of the second cable to be wound onto the cylinder which thereby pulls tractor 11R to the right and also lengthens the section 50B to permit leftward movement of tractor 11L. Since tractor 11L is connected to tractor 10R by the cable 90 it will be seen that the rightward movement of tractor 10R caused by the winding of section 40A about the cylinder 45 will cause simultaneous leftward movement of tractor 11L. In a similar manner the cable 80 connected to tractors 10L and 11R will cause the upper left tractor 10L to be pulled to the left in response to rightward movement of tractor 11R. Thus it is seen that if the cylinder 45 is rotated counterclockwise the separation between the tractors will be increased to thereby accommodate a wider form. In a similar manner clockwise rotation of the cylinder 45 will cause a decrease in the separation of the left and right sets of tractors so that a smaller form can be accommodated. That is, when the cylinder 45 is rotated clockwise the sections of cable 40B and 50B will be wound thereon and hence the tractors 10L and 11L to which these sections are connected will be pulled to the right. As the tractors 10L and 11L move to the right the cables 80 and 90 respectively connected thereto and to the tractors 11R and 10R will cause the tractors 10R and 11R to move to the left. Thus it is seen that the separation of the left set of tractors 10L and 11L from the right set of tractors 10R and 11R is easily and accurately varied by the rotation of the cylinder 45.

To accommodate any variation in the length of the cables which might occur in response to ambient temperature changes, coil springs 88 and 98 may advantageously be connected in the cables 80 and 90. The springs 88 and 98 are relatively strong and therefore there is little or no tendency for these springs to expand or contract unless the length of the cables tends to change because of temperature changes.

The means for simultaneously translating all four tractors in the same direction includes a fifth cable 110 having a first section 110A connected to a frame 116 which supports the movable pulleys 42 and 47 (FIG. 2A). The section 110A of the fifth cable passes from the frame 116 around a stationary pulley 111 and then around a second threaded cylinder 115. The other portion of the fifth cable is identified as section 110B and is connected to a second frame 117 which supports the movable pulleys 82 and 92. The section 110B of the fifth cable passes around the stationary pulleys 112 and 113 and then goes around the cylinder 115.

In a similar manner a sixth cable 120 has sections 120A and 120B which are respectively connected to the third and fourth pulley support frames 126 and 127. From FIGS. 2A and 2B it will be seen that pulley frame 126 supports movable pulleys 52 and 57 while frame 127 supports pulleys 85 and 95. Section 120A extends from frame 126 around a stationary pulley 121 and is then wrapped around the front end of cylinder 115. Section 120B passes around stationary pulleys 122 and 123 and then to the cylinder 115. It should be noted at this point that although the sections of the cables are identified as "A" and "B" sections it should be understood that each of the cables having such "A" and "B" sections is in fact a single unitary cable. It should also be noted that the first four cables, 40, 50, 80, and 90 could in practice be in the form of a single endless cable with the tractors being secured thereto at the proper places. The invention is best understood, however, by making use of the four separate cables, two of which have "A" and "B" sections.

It will be seen in FIGS. 2A and 2B that if the cylinder 115 is rotated counterclockwise section 110A of the fifth cable will be wound upon the cylinder and that the length of section 110B will be increased. Accordingly pulleys 42 and 47 will be pulled rearwardly and therefore the upper tractors 10R and 10L will be pulled to the right. Simultaneously therewith the pulleys 82 and 92 will move forwardly to permit such movement. In a similar manner such counterclockwise movement of cylinder 115 will cause pulleys 52 and 57 to be pulled rearwardly while pulleys 85 and 95 are allowed to move forwardly. As a result it will be seen that the four tractors will be simultaneously translated to the right. In a similar manner, clockwise movement of cylinder 115 will cause the four tractors to be moved simultaneously to the left.

Figure 6:
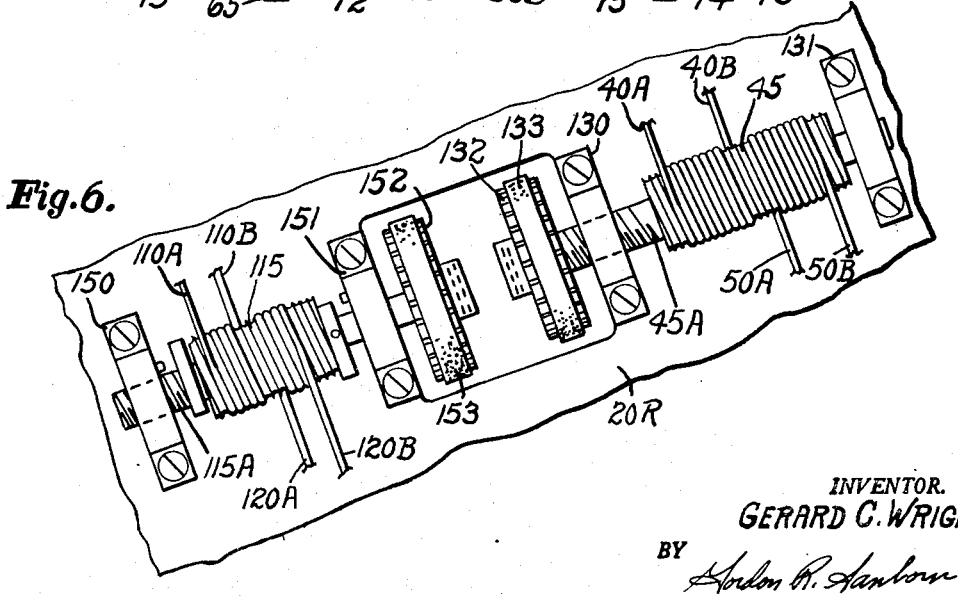
FIG. 6 is a left side view of the threaded cylinders on the left side of the right main frame about which the cables in the apparatus are wound.

As seen more clearly in FIG. 6 the cylinder 45 is supported for rotation by stationary support members 130 and 131 on the left side of frame 20R. The support members 130 and 131 permit rotation of the cylinder 45, and as seen in FIG. 6 the rearwardly extending end 45A of the cylinder 45 is threaded and screwed into the support member 130 so that when the cylinder 45 is rotated the cylinder will be translated either forwardly or rearwardly depending upon the direction of rotation. This small forward and rearward movement of the cylinder 45 which takes place because of the threading of the section 45A into the support member 130 helps to maintain the sections of cable 40A, 40B, 50A and 50B in their same respective planes. Also as seen in FIG. 6 the cylinder 45 is preferably threaded so that the cables wound thereon will be disposed within the grooves of the threads and hence any tendency for cable "pile-up" will be eliminated. It will be seen that since the cylinder 45 is threaded and the rearwardly extending portion thereof 45A which is disposed within the support member 130 is threaded that level winding of the cables thereon is assured.

As seen in FIGS. 2A, 6 and 8 the rearwardly extending end of the cylinder 45 which passes through the support member 130 has a geared wheel 132 secured thereto. An endless geared belt 133 passes around the wheel 132, through the right frame 20R (FIG. 2A), around the idler pulleys 134 and 136 on the right side of frame 20R, and then around the driving wheel 137 secured to the end of a shaft 138. A short shaft 142 is aligned with the shaft 138 for reasons described hereinafter, said shafts 138 and 142 being supported for rotation by brackets 139 and 140 on the right side of frame 20R. A knob 141 is secured to the front end of shaft 142 to facilitate manual adjustment of the cylinder 45.

In a similar manner the cylinder 115 is supported by stationary support members 150 and 151 (FIG. 6) secured to the left side of the main frame 10R. In a manner substantially identical to that provided for the cylinder 45, the cylinder 115 is threaded and has a rearwardly extending portion 115A which is threaded into the support member 150 so that as the cylinder 115 is rotated level winding of the cables thereon will be assured. Also as seen in FIG. 6 the forwardly extending portion of the cylinder 115 which is of reduced diameter and passes through the support member 151 carries a geared wheel 152. A second geared belt 153 encompasses wheel 152, passes through the frame 20R, around the idler pulleys 154 and 156 (FIG. 2A), and then around the geared driving wheel 157 secured to the rear end of a shaft 158 carried by brackets 159 and 160 on the right side of frame 20R. A second knob 161 is secured to the front end of the shaft 158 to facilitate manual adjustment of the cylinder 115.

From the above it will be seen that rotation of the knob 161 will cause simultaneous translation of the four tractors in the same direction while rotation of the knob 141 will cause the distance between the left and right tractors to be increased or decreased.

Once the separation of the left and right tractor assemblies has been correctly established it is advantageous to make certain that such separation does not change even though the entire assembly is translated from one side of the machine to the other. It will be seen that as long as the cylinder 45 is held against rotation the distance between the left set of tractors and the right set of tractors will remain constant even though the cylinder 115 is rotated to change the lateral positions of the tractors. Accordingly, a unidirectional force transmitting or coupling assembly 170 is provided between the control knob 141 and the shaft 138, said assembly being so constructed that the shaft 138 (and hence the cylinder 45) can only be rotated in response to rotation of the knob 141 and shaft 142 secured thereto. That is, the assembly 170 serves to couple the shaft 142 with the shaft 138 for the transmission of torque from the shaft 142 to the shaft 138 but acts as a brake on the shaft 138 unless the knob 141 is being rotated. The details of the coupling assembly 170 will be more clearly understood from FIG. 3 wherein the assembly is illustrated in an exploded view.

Figure 3:
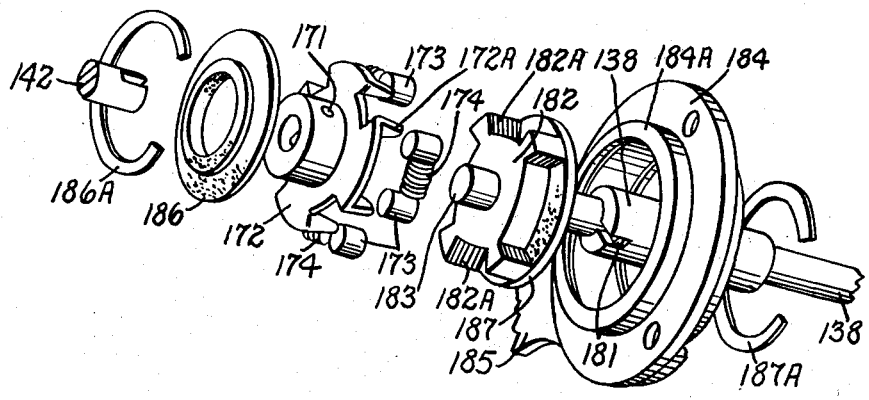
FIG. 3 is an exploded illustration of a coupling or clutch and brake assembly used in the manual controls for the tractor adjustment mechanism.

In FIG. 3 it will be seen that the rear end of the shaft 142 is slotted and encompasses a pin 171 carried by a driving member 172 having eight rearwardly extending lugs 172A. Four pairs of free-floating rollers 173 are disposed between adjacent ones of the lugs 172A and are urged away from each other by means of coil springs 174 disposed therebetween. The front end of the shaft 138 is slotted and encompasses a pin 181 carried by a second member 182 having four substantially rectangular radial lugs 182A. The member 182 also has a forwardly extending portion 183 which is adaptable to an opening in the member 172 so that the parts fit together. When the device is assembled pairs of the rollers 173 are positioned between adjacent ones of the lugs 172A, and the lugs 172A are in turn disposed between adjacent ones of the lugs 182A. The two members 172 and 182 are then disposed within the central cylindrical opening of a housing 184. A cylindrical portion 184A of the housing 184 serves as a bearing for the members 172 and 182 and also acts in the manner described hereinafter as a stationary surface to provide the necessary braking action. The housing 184 is secured to a bracket 185 which is in turn secured to the right side of the main frame 20R. Retaining members 186 and 187 held inside the housing 184 by spring clips 186A and 187A maintain the parts in their proper positions.

The operation of the coupling assembly 170 is as follows: When the shaft 142 is rotated in a clockwise direction four of the lugs 172A will be moved against associated ones of the lugs 182A (the arrangement of the parts being such that when the parts are assembled there is a small amount of free space between the lugs 172A and the lugs 182A). Accordingly force will be transmitted from the shaft 142 to the shaft 138 and rotation of the members 172 and 182 will take place. During such rotation in a clockwise direction the other four lugs 172A will serve to move the associated ones of the rollers 173 in contact therewith in a clockwise direction with respect to the member 182 so that the rollers 173 are moved slightly toward the center of the member 183. Therefore ample clearance is provided between the rollers and the cylindrical portion 184A of the housing 184 and rotation of shaft 138 is not impeded. A similar action takes place when the shaft 142 is moved in a counterclockwise direction.

The arrangement of the parts is such that the springs 174 normally urge the rollers 173 away from each other to positions such that the rollers 173 are in engagement with the member 182 and also in engagement with the cylindrical portion 184A of the housing 184. Accordingly it will be seen that if an attempt is made to rotate the shaft 138 a bind will take place between four of the rollers 173 and the housing 184, such rotation tending to cause said four rollers (one from each of the four sets) to move to increased distances from the center of the member 182. This of course increases the binding and prevents any rotation of the shaft 138. This action will of course take place regardless of the direction of the force applied directly to the shaft 138. It will be seen that this mechanism is similar to the conventional and well known wedge-type or check-ball-type of unidirectional clutch except that two sets of rollers are used to provide positive drive by the shaft 142 in either direction and to prevent movement in either direction by the shaft 138 in response to forces applied directly thereto.

From the above it will be seen that the cylinder 45 is locked against rotation and can be moved only in response to rotation of the knob 141. Therefore once the tractors have been set to their proper separation for a given form such setting will not change even though the knob 161 is operated to translate the tractors to a new lateral position. The specific mechanism 170 is commercially available and is found advantageous in the present invention, but it is obvious that any other similar type device could be used to transmit torque from the shaft 142 to the shaft 138 and yet serve as a brake on the shaft 138 unless torque is applied to the shaft 142.

One manner of operation of the above-described mechanism which is of particular value is when the operator rotates the knob 141 to spread (or close) the tractors and during such adjustment brings either set of tractors against a limit position, the knob 141 can still be rotated to continue the adjustment of the tractors. For example, if the knob 141 is rotated counterclockwise to spread the tractors it will be seen that the length of sections 40A and 50A of the first and second cables will be shortened while the length of the sections 40B and 50B will be lengthened. If the four tractors were initially positioned to hold a given form to the left of the center of the machine it will be seen that as the tractors are being spread the left tractors 10L and 11L will reach their leftmost positions before the right tractors have reached their rightmost positions. In prior art devices this would necessitate a translation of the four tractors to the right to move the left tractors away from their limit positions so that further spreading of the tractors could be accomplished. However in the present mechanism it will be noted that there is no brake mechanism associated with the cylinder 115 and shaft 158 associated therewith. Therefore if the knob 141 is further rotated in a counterclockwise direction under the above conditions (with the left tractors already in their leftmost positions) the shortening of the cable sections 40A and 50A will cause the tractors 10R and 11R to continue their rightward movement. Cable 90 which is connected to the upper right tractor 10R is seen to pass around the movable pulleys 92 and 95 and therefore since the lower left tractor 11L to which the cable 90 is connected cannot move to the left the rightward movement of tractor 10R will cause the movable pulleys 92 and 95 to be pulled forwardly. In a similar manner the rightward movement of the lower right rtactor 11R to which cable 80 is connected will cause the pulleys 82 and 85 to move forwardly (the sets 82 and 92 and 85 and 95 moving in unison). The forward movement of the left-hand sets of movable pulleys 82 and 92 and 85 and 95 will be seen to cause counterclockwise rotation of the cylinder 115 so that the right-hand sets of movable pulleys will move rearwardly to permit such forward movement. Thus it is seen that the sections of cable 40A and 50A are being shortened at the same time that the right-hand sets of movable pulleys 42 and 47 and 52 and 57 are moving rearwardly and hence the rate of separation of the tractors is increased. A similar operation results whenever knob 141 is rotated with either of the sets of tractors 10L and 11L or 10R and 11R held against movement by virtue of being against either their outer limit positions or their inner limit positions against the central pulley supports 65 and 75.

Another particular advantage of this apparatus becomes apparent when an operator wants to insert a form and have it centered in the machine. In such a case the knob 141 is rotated until the left and right sets of tractors are each in their inner (minimum spread) or outer (maximum spread) positions. Thereafter as the knob 141 is rotated to adjust the spread to that of the form, the amount of movement of the left and right sets of tractors will be equal and hence the form will be centered.

An additional adjustment apparatus for the cable assembly is provided so that during initial assembly of the cables the correct relationship of the upper and lower sets of tractors is obtained. As previously stated, the various pulleys described as being stationary are supported either on the main frames 20R and 20L or on the stationary central pulley support brackets 65 and 75. Thus as seen in FIG. 7 the pulleys 83, 93, 84 and 94 are supported on the frame 20L by means of associated screws 200 which pass therethrough and are threaded into the frame 20L. Pulleys 81 and 91 are supported by means of a bracket 201 screwed to the frame 20L and in a similar manner pulleys 86 and 96 are supported by a bracket 202. Pulleys 112 and 122 are respectively supported by small brackets 203 and 204 screwed to the frame 20L. As seen in FIG. 8 pulleys 43, 48, 54, 58, 111 and 121 are respectively supported by means of one of the screws 200 which passes through the center of the pulleys and is threaded into the frame 20R. Pulleys 113 and 123 are supported by brackets 206 and 207, respectively. Pulleys 46 and 41 are supported by a bracket 208 and pulleys 51 and 56 are supported by a bracket 209. It will be seen in FIGS. 7 and 8 that each of the above referred to brackets is rigidly secured to one of the frames 20L or 20R and hence the associated pulleys are maintained in a fixed position with respect to the frames. As seen in FIG. 8, however, pulleys 44 and 49 are respectively supported by brackets 210 and 211 pivoted respectively on screws 212 and 213 in a manner such that the positions of the pulleys 44 and 49 can be adjusted. To this end a stationary bracket 214 is secured to the frame 20R and has a pair of adjustment screws 216 and 217 threaded therethrough. The upper end of the screw 216 rests against the bottom of support member 212 and the upper end of the screw 217 rests against the bottom of support member 211. Accordingly the setting of the screws 216 and 217 serves to control the positions of the pulleys 44 and 49. When the apparatus is initially assembled the lower tractor assemblies might be slightly misaligned with respect to the upper tractor assemblies and therefore the screws 216 and 217 are adjusted to bring the upper set of tractor assemblies into alignment with the lower set. It will be seen that when the screws 216 and 217 are adjusted the positions of the pulleys 44 and 49 will be changed and hence the upper set of tractors can be moved by a small amount with respect to the lower sets of tractors.

While the specific arrangement of the cables as illustrated in FIGS. 2A and 2B is preferred, it should be noted that variations thereof are evident. For example, in the arrangement as illustrated in FIGS. 2A and 2B the cables 80 and 90 extend between the upper and lower tractors and are part of the apparatus necessary for adjusting the spread of the tractors. By using such an arrangement wherein relatively long sections of the cables 80 and 90 are provided between the pulleys 83—84 and 93—94 ample room is provided for the springs 88 and 98. A different arrangement of the cables which would provide a substantially identical manner of operation for the apparatus is shown in FIGS. 2A and 2C. The cable 90 extending to the left from the upper right tractor 10R (FIG. 2B) after passing around the pulleys 63, 62, 91, 92, and 93 is returned around the pulley 82, the stationary pulley 81, and secured to the left side of the tractor 10L. The portion of the cable 80 extending to the left from the lower right tractor assembly 11R after passing around pulleys 73, 72, 86, 85, and 84 is returned around the movable pulley 95, the stationary pulley 96, and secured to the left side of the lower left tractor assembly 11L. With this modified arrangement of the cables it will be seen that when the cylinder 45 is rotated in a counterclockwise direction the sections of cable 40A and 50A are wound thereon and hence the tractor assemblies 10R and 11R are moved to the right, such rightward movement of the assemblies 10R and 11R serving to move the tractor assemblies 10L and 11L leftwardly. In a similar manner clockwise movement of the cylinder 45 serves to pull the tractor assemblies 10L and 11L rightwardly which in turn causes leftward movement of the right tractor assemblies 10R and 11R.

The arrangement shown at FIGS. 2A and 2C together of the cables, as well as in the arrangement illustrated in FIG. 2B, it will be seen that the left and right tractor assemblies are so interconnected by means of the cables that when the cylinder 45 is rotated in one direction to apply a direct rightward force to the right tractor assemblies 10R and 11R a leftward force will be simultaneously transmitted to the left tractor assemblies 10L and 11L. Similarly, when the cylinder 45 is rotated in the opposite sense a direct rightward force is applied to the left tractor assemblies 10L and 11L and the resulting rightward movement of the left tractor assemblies 10L and 11L will cause a leftward force to be applied to the right tractor assemblies 10R and 11R.

There has been disclosed an improved adjustment mechanism particularly adapted for use in high speed printers of the type having left and right paper advancing devices commonly referred to as tractors. The device of the present invention is of reduced cost in comparison to some of the types presently used in the art, and in addition provides for a more versatile adjustment of the tractor assemblies. It is obvious, of course, that while steel cables have been described as being preferred in the embodiment illustrated, other similar flexible force transmitting members can be used.

What is claimed is:

1. A form feeding apparatus and control assembly therefor comprising in combination: first and second form moving devices; first support means for said first and second devices; third and fourth form moving devices; second support means for said third and fourth devices, said devices being so positioned on said support means that said first and third and said second and fourth devices are adapted for alignment; first flexible force transmitting means connected to said first and third and to said second and fourth devices and extending from each in a first direction; first control means coupled with said first force transmitting means and adapted upon operation in a first sense to apply a force to said first and third devices in said first direction and upon operation in a second sense to apply a force to said second and fourth devices in said first direction; second flexible force transmitting means connected to said first and third and to said second and fourth devices and extending from each in a second direction opposite to said first direction and adapted upon movement of said first and third devices in said first direction to apply a force to said second and fourth devices in said second direction and upon movement of said second and fourth devices in said first direction to apply a force to said first and third devices in said second direction.

2. A form feeding apparatus and control mechanism therefor comprising in combination: left and right sets of form feeding devices, each of said sets including an upper and a lower device; means supporting each of said devices for simultaneous operation to advance a form in a first direction and for lateral movement in second and third opposite directions which are perpendicular to said first direction; first and second cables each having a first section connected to a device in said first set and a second section connected to a device in said second set, each of said sections extending from the associated device in said second direction; third and fourth cables each having a first section connected to a device in said first set and extending in said third direction therefrom and a second section connected to a device in said second set and extending in said third direction therefrom; and control means adapted to shorten or lengthen the first sections of said first and second cables and to simultaneously lengthen or shorten the second sections of said first and second cables.

3. A form feeding apparatus and control mechanism therefor as defined in claim 2 wherein said control means includes a rotatable element having said first cable wound thereon.

4. A form feeding apparatus and control mechanism therefor in accordance with claim 2 wherein said means supporting said devices includes stationary frame means and wherein said control means includes a threaded cylindrical element supported for rotation by said frame means and having said first and second cables wound thereon.

5. A form feeding apparatus and control mechanism therefor in accordance with claim 2 wherein said control means comprises: a rotatable element having said first and second cables wound thereon, a manually rotatable control shaft, means coupling said shaft with said element to cause rotation of said element in response to rotation of said control shaft and adapted to prevent rotation of said element unless said control shaft is rotated.

6. A form feeding apparatus and control mechanism therefor in accordance with claim 4 and including: first and second movable cable guide members each engaged with one of the first and one of the second sections of said first and second cables; third and fourth movable cable guide members each engaged with one of the first and one of the second sections of said third and fourth cables; and second control means coupled with said members and operable to simultaneously move said first and second members in a fourth direction perpendicular to said second and third directions and said third and fourth members in a fifth direction opposite to said fourth direction.

7. A form feeding apparatus and control mechanism therefor as defined in claim 6 wherein said second control means comprises: a fifth cable connected to said first and third members; a sixth cable connected to said second and fourth members; and a second cylindrical element supported for rotation by said frame means and having said fifth and sixth cables wound thereon.

8. A form feeding apparatus comprising in combination: first, second, third and fourth form feed devices; support means for said devices, said devices being so positioned thereon that said first and third devices are adaptable to vertical alignment and said second and fourth devices are adaptable to vertical alignment; first cable means connected to each of said devices and extending in a first direction from each; control means coupled with said cable means adapted to selectively cause movement of either said first and third or said second and fourth assemblies in said first direction; cable support means; and second cable means connected to each of said devices and extending from each in a second direction opposite to said first direction and passing around said cable support means, said second cable means being adapted to cause movement of said second and fourth devices in said second direction in response to movement of said first and third devices in said first direction and to cause movement of said first and third devices in said second direction in response to movement of said second and fourth devices in said first direction.

9. A form feeding apparatus comprising in combination first and second form feeding tractor assemblies; a first shaft supporting said tractor assemblies for lateral movement thereon; third and fourth form feeding tractor assemblies; a second shaft supporting said third and fourth tractor assemblies for lateral movement thereon; first and second frame means supporting said first and second shafts for rotation; a first manually operable control member supported for rotation on said first frame means; a first cable having a first section connected to said first tractor assembly and a second section connected to said second tractor assembly, said sections extending in a first direction from said assemblies and being wrapped around said first control member; a second cable having a first section connected to said third tractor assembly and a second section connected to said fourth tractor assembly, said sections of said second cable extending in said first direction from said third and fourth tractor assemblies and being wound around said first control member, said cables being wound around said member in a manner such that when said member is rotated the length of said first sections will be decreased or increased while simultaneously therewith the lengths of said second sections will be increased or decreased; a third cable having a first section connected to said first assembly and extending in a second direction therefrom which is opposite to said first direction and a second section connected to said fourth assembly and extending in said second direction therefrom; a fourth cable having a first section connected to said second assembly and extending in said second direction therefrom and a second section connected to said third assembly and extending in said second direction therefrom; and means maintaining each of said sections extending in their respective indicated directions from the associated assemblies.

10. A form feeding apparatus as defined in claim 9 and including first and second movable elements respectively coupled with each of the sections of said first and second cables; third and fourth movable elements respectively coupled with the first sections of said third and fourth cables and with the second sections of said third and fourth cables; a fifth cable connected to said first movable element and to said third movable element; a sixth cable connected to said second and to said fourth movable elements; a second control member having said fifth and sixth cables connected thereto and adapted upon operation to move said first and second elements in a third direction perpendicular to said first direction and to simultaneously therewith move said third and fourth elements in a fourth direction opposite to said third direction.

11. A form feeding apparatus comprising first and second feed devices engaging the opposite sides of a form, support means for said devices, first cable having one end attached to the first device and its other end attached to the second device, a rotatable cylinder, the intermediate portion of said first cable being helically wound around said cylinder, second cable having one end attached to the first device and the other end attached to the second device, means causing said second cable to apply an opposing force to the force applied to said devices by said first cable, and means to rotate said cylinder, whereby rotation in one direction permits said devices to be moved along said support away from each other and rotation in the opposite direction permits said devices to be moved along said support toward each other.

12. A form feeding apparatus as recited in claim 11 including means for pulling the intermediate portion of said first cable causing both devices to be laterally displaced in one direction along said support while maintaining a constant distance therebetween, and means for pulling the intermediate portion of said second cable causing both devices to be laterally displaced in the opposite direction along said support while maintaining a constant distance therebetween.

References Cited in the file of this patent
UNITED STATES PATENTS

| | | |
|---|---|---|
| 2,140,028 | Nichols | Dec. 13, 1938 |
| 3,006,520 | House | Oct. 31, 1961 |